(12) United States Patent
Yoshida et al.

(10) Patent No.: US 7,043,558 B2
(45) Date of Patent: May 9, 2006

(54) DATA COMMUNICATION APPARATUS AND DATA COMMUNICATION METHOD

(75) Inventors: Hiroshi Yoshida, Tokyo (JP); Yasuhiro Suzuki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 806 days.

(21) Appl. No.: 10/137,356

(22) Filed: May 3, 2002

(65) Prior Publication Data

US 2003/0093488 A1   May 15, 2003

(30) Foreign Application Priority Data

Nov. 15, 2001   (JP) .............................. 2001-349964

(51) Int. Cl.
*G06F 15/16*   (2006.01)

(52) U.S. Cl. ...................... 709/231; 709/235; 709/238; 709/239

(58) Field of Classification Search ................ 709/231, 709/235, 238, 239
See application file for complete search history.

(56) References Cited

U.S. PATENT DOCUMENTS

| | | | |
|---|---|---|---|
| 5,892,914 A | 4/1999 | Pitts | |
| 5,933,603 A | 8/1999 | Vahalia et al. | |
| 6,061,731 A * | 5/2000 | Blakeslee | 709/231 |
| 6,085,234 A | 7/2000 | Pitts et al. | |
| 6,760,765 B1 * | 7/2004 | Asai et al. | 709/226 |
| 2002/0073084 A1 * | 6/2002 | Kauffman et al. | 707/10 |
| 2002/0161911 A1 * | 10/2002 | Pinckney et al. | 709/231 |
| 2003/0055910 A1 * | 3/2003 | Amini et al. | 709/214 |
| 2003/0093515 A1 * | 5/2003 | Kauffman | 709/224 |

FOREIGN PATENT DOCUMENTS

| | | |
|---|---|---|
| JP | 2000-057072 | 2/2000 |
| JP | 2000-293424 | 10/2000 |
| JP | 2001-069485 | 3/2001 |
| JP | 2001-075850 | 3/2001 |

OTHER PUBLICATIONS

Rodriguez, P. et al., "Parallel-Access for Mirror Sites in the Internet," INFOCOM 2000, 19th Annual Joint Conf. of the IEEE Computer and Communications Societies, Tel Aviv, Israel, Mar. 26-30, 2000, Piscataway, NJ, USA, Mar. 26, 2000, pp. 864-873.

Palacharla, S. et al., "Evaluating Stream Buffers as a Secondary Cache Replacement," Proceedings of the Annual International Symposium on Computer Architecture, Chicago, Apr. 18-21, 1994, Los Alamitos, IEEE Comp. Soc. Press, U.S., vol. SYMP. 21, Apr. 18, 1994, pp. 24-33.

* cited by examiner (Continued)

*Primary Examiner*—Jack A. Lane
(74) *Attorney, Agent, or Firm*—Birch, Stewart, Kolasch & Birch, LLP

(57) ABSTRACT

The present invention aims to embody a cache server which can provide the service of the same quality as a media server. A client sends a delivery request for a streaming delivery of a specific media file to a media server, and a cache checking unit of the cache server checks if the requested media file is stored in a cache file storing unit as a cache file. If it is stored, a file streaming delivering unit performs the streaming delivery to the client using the cache file. If not stored, the cache checking unit transfers the delivery request to the media server, and the media server performs the streaming delivery, and in parallel with the streaming delivery, at the cache server, a media file obtaining unit obtains the requested media file from the media server and stores the requested media file in the cache file storing unit.

15 Claims, 9 Drawing Sheets

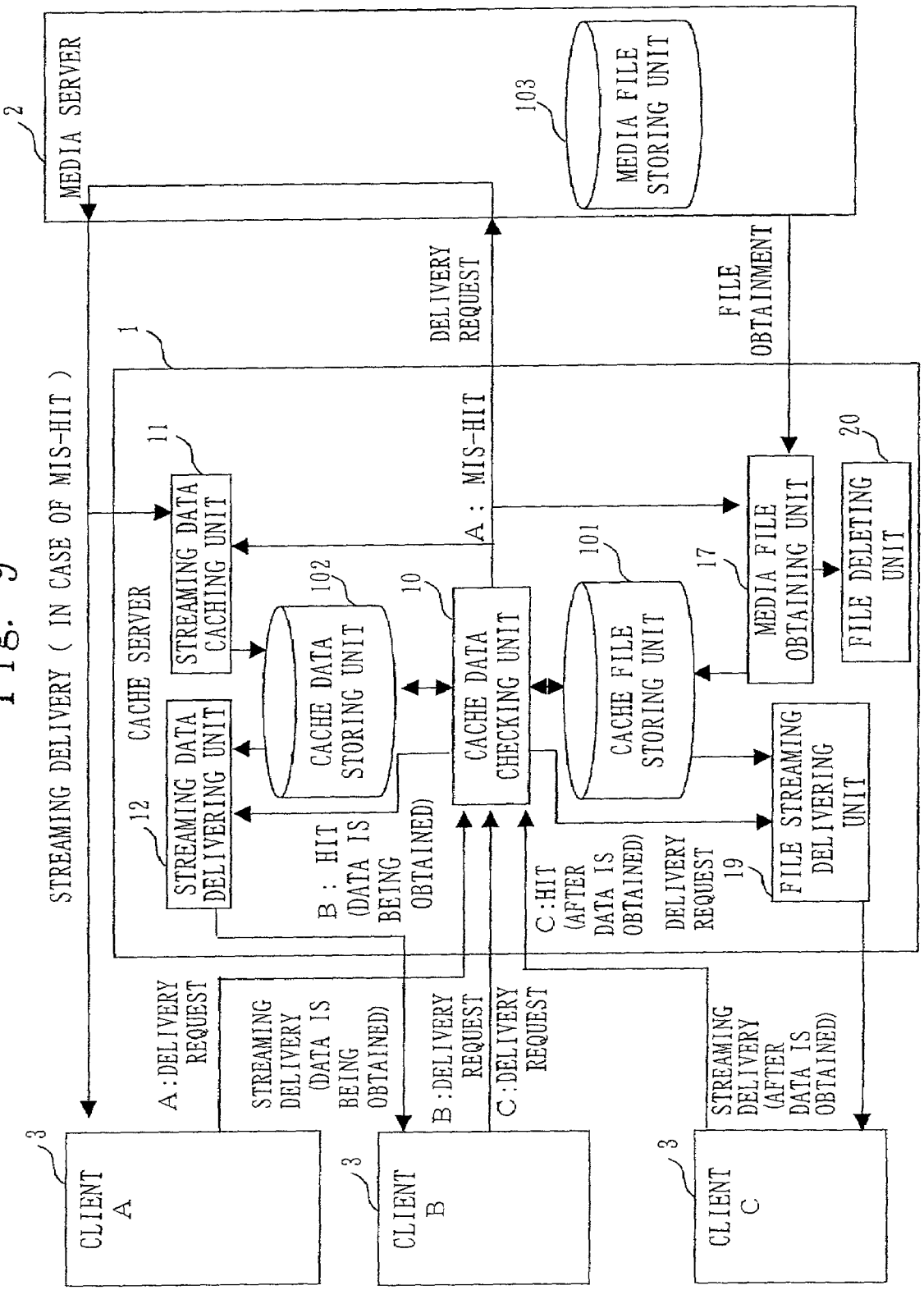

DATA COMMUNICATION APPARATUS AND DATA COMMUNICATION METHOD

BACKGROUND OF THE INVENTION

1. Field of the Invention

The present invention relates to a streaming delivery system, in which a client who reproduces streaming data and a media server for distributing the streaming data are connected by at least one kind of network, and in which a cache server is located in the network between the client and the media server, and relates to a cache server apparatus and cache method for dispersing a load of the media server by caching the streaming data with the cache server and reducing congestion of the network between the client and the media server.

The network which delivers the streaming data includes, for example, the Internet, digital TV networks, satellite communication, and any other kinds of communication means, regardless of wired or wireless.

2. Description of the Related Art

In the streaming delivery system through the network, the streaming data delivered by the media server is precisely divided and delivered according to the communication rule. As the client receives the divided data, the client reproduces the data.

The cache server apparatus which is located between the client and the media server, caches the streaming data sent/received between the client and the media server, and delivers cached streaming data instead of the media server in response to a request for the same streaming data by another client.

In this way, it is avoidable that too many requests from clients gather at the media server, and it is possible to reduce a traffic load of the network.

The Japanese Unexamined Patent Publication No. 2001-69485 discloses a proxy server, which operates in the above way, for a video-on-demand system through the network.

The streaming data is not static data, so that, generally, it is necessary to send/receive a predetermined amount of data within a predetermined time. For example, the media data having a predetermined reproducing time such as video or sound is delivered from the media server with keeping real time, and the client reproduces the streaming data, as it receives the streaming data delivered from the media server.

An apparatus and a method for caching the streaming data, considering a characteristic of the streaming data, is disclosed in Japanese Unexamined Patent Publication No. 2000-293424. According to this invention, in case of caching the streaming data in response to the request from the client, if the request from the client is suspended, instead of the client, the cache server apparatus obtains data of a time period of the streaming data and stores in the cache.

Problems to be Solved by the Invention

Generally, in case of the streaming delivery, the real-time reproduction of the data in response to the request from the client is important, so that the streaming delivery is usually performed based on the communication rule which is suitable for keeping the real time.

However, such a communication rule simplifies a sending/receiving process by eliminating a process for checking if the data is received by the recipient and so on, but on the contrary, it is not guaranteed that the delivered streaming data reaches the recipient.

Consequently, there is a possibility that a part of data becomes missing depending on the congestion status of the network.

According to the related art, in case of caching the streaming data, if a part of data is missing as described above, the cache server stores the streaming data except the missing data in the cache, and makes it as cache data. In this case, the stored cache data lacks the missing data compared with the streaming data delivered from the media server. At this stage, if another client requests for the streaming delivery of the same streaming data, the cache server apparatus cannot deliver the streaming data. In another way, the streaming data in which the missing data is lacked is delivered from the cache server. Both create problems.

Further, a media file stored in the media server for streaming delivery normally contains plural pieces of streaming data having related contents. For example, one media file contains plural pieces of streaming data having the same contents but different qualities. With this kind of the media file, from plural pieces of streaming data having different qualities, at least one streaming data is selected and delivered according to the band width of the network used for the streaming delivery or a purpose of using the streaming data at the client. The data of the best quality may be selected automatically from various conditions by the media server or the client, or a specific piece of data is selected intentionally by the user regardless of conditions. In addition to the above, the media file can contain multi-angle video data taken from multiple angles, static image data related to a motion picture, and so on. Also in this case, the media server only delivers the streaming data requested by the client.

Here, only one piece of streaming data out of plural pieces of streaming data contained in one media file is delivered from the media server, on one request from one client, so that the cache server apparatus according to the related art stores only one piece of streaming data delivered by the media server in the cache. Namely, the streaming data which relates to the requested streaming data is not stored in the cache.

Under this condition, even if another client requests for the streaming data in the same media file, the streaming data stored in the cache may not match the request of the client. For example, if the band width of the network to which the client belongs is narrow, the streaming data stored in the cache cannot be applied to the client, because the network of the client cannot hold the quality (transfer ratio) of the streaming data stored in the cache.

Accordingly, there are problems that the cache server apparatus cannot perform streaming delivery, or even if the cache server apparatus performs streaming delivery, the client cannot reproduce the streaming data sufficiently.

Since ADSL (Asymmetric Digital Subscriber Line), CATV (Cable TV) Internet connection service, FTTH (Fiber To The Home), etc. have been spread among common families, a high-speed connection to ISP (Internet Service Provider), which is an initial connection point, can be performed. Because of this, it becomes possible to reproduce at a relatively high speed the media file stored in the media server of ISP, with which each user makes a contract.

However, if the user wants to reproduce the media file at the media server in a distance, the data from the media file should be transferred through multiple networks which constitute the Internet, so that it is not avoidable for the data to be transferred through probable congested networks.

Therefore, it is difficult to secure the band width to transfer the data, that is, it is difficult to directly receive or reproduce the media file containing data of a motion picture or sound which is constructed in time series and the real-time reproduction is required.

The present invention is provided to solve the above problems. The invention aims to implement, for example, a cache server system which provides the same service as the media server by storing the file having the same contents as the media file stored in the media server even if a part of data is lost at the streaming delivery.

Further, another object of the present invention is, for example, to implement a cache server system which provides the service of the same quality as the media server by storing the media file including plural pieces of related streaming data in the cache as a cache file based on a request from one client as a trigger.

Further, the present invention is applicable to the broadcast or multicast. Namely, the present invention aims to implement a cache server system which stores in the cache the streaming data delivered from the media server (e.g., TV broadcasting station, the Internet broadcasting station) even with no request from any client, and performs streaming delivery of the stored streaming data in response to the request from the client.

SUMMARY OF THE INVENTION

According to the present invention, a data communication apparatus for performing communication between a terminal device requesting streaming delivery of information data and a delivering apparatus holding at least one information data file containing at least one piece of information data and performing the streaming delivery of the information data requested by the terminal device, the data communication apparatus includes:

a file caching unit available to store any piece of the information data file;

a delivery request receiving unit for receiving a delivery request of the streaming delivery of specific information data from the terminal device;

a data checking unit for checking if the information data file containing requested information data of which the streaming delivery is requested by the delivery request is stored in the file caching unit, and sending the delivery request to the delivering apparatus if the information data file containing the requested information data is not stored in the file caching unit;

a file transmission requesting unit for sending a file transmission request for requesting a transmission of requested information data file containing the requested information data out of the information data file held by the delivering apparatus if the requested information data file containing the requested information data is not stored in the file caching unit;

a file receiving unit for receiving the requested information data file sent from the delivering apparatus in response to the file transmission request, and In the data communication apparatus, the file caching unit stores the requested information data file received by the file receiving unit.

The data communication apparatus further includes a data delivering unit performing the streaming delivery of the requested information data to the terminal device from the file caching unit if the information data file containing the requested information data is stored in the file caching unit.

The data communication apparatus further includes:

a communication rate checking unit for checking a communication rate available for receiving the requested information data file by the file receiving unit; and a communication rate setting unit for setting the communication rate used for receiving the requested information data file by the file receiving unit based on the available communication rate checked by the communication rate checking unit, and in the data communication apparatus, the file receiving unit receives the requested information data file at the communication rate set by the communication rate setting unit.

In the data communication apparatus, the data communication apparatus is connected to the delivering apparatus though plural communication channels, the data communication apparatus further comprising a communication channel selecting unit for selecting a communication channel used for receiving the requested information data file by the file receiving unit, and the file receiving unit receives the requested information data file using the communication channel selected by the communication channel selecting unit.

The data communication apparatus further includes a delivery request counting unit for counting a number of transmission of the delivery request for each of the requested information data each time the data checking unit sends the delivery request to the delivering apparatus, and in the data communication apparatus, the file transmission requesting unit sends the file transmission request to the delivering apparatus only for the requested information data of which the number of transmission counted by the delivery request counting unit exceeds a predetermined threshold value.

The data communication apparatus further includes a communication rate dynamically setting unit for dynamically setting a communication rate used for receiving the requested information data file by the file receiving unit when the file receiving unit receives the requested information data file, and in the data communication apparatus, the file receiving unit receives the requested information data file at the communication rate dynamically set by the communication rate dynamically setting unit.

In the data communication apparatus, when the delivery request receiving unit receives the delivery request for the requested information data from a new terminal device before the file caching unit finishes storing the requested information data file, the data delivering unit performs the streaming delivery of the requested information data to the new terminal device from the file caching unit after the requested information data file has been stored in the file caching unit.

The data communication apparatus further includes:

an information data receiving unit for receiving the requested information data of which the streaming delivery is performed from the delivering apparatus to the terminal device; and an information data caching unit for storing the requested information data received by the information data receiving unit, and in the data communication apparatus, when the delivery request receiving unit receives the delivery request for the requested information data from a new terminal device before the information data caching unit finishes storing the received requested information data, the data delivering unit performs the streaming delivery of the received requested information data to the new terminal device sequentially from a part of the received requested information data, which has been already stored in the information data caching unit.

The data communication apparatus further includes a data deleting unit for deleting duplicated information data stored in the information data caching unit when the information data in the file caching unit and the information data in the information data caching unit are duplicated.

According to another aspect of the invention, a data communication method for performing communication between a terminal device for requesting streaming delivery of information data and a delivering apparatus holding at least one information data file containing at least one piece of information data and performing the streaming delivery of the information data requested by the terminal device, the method includes:

recording any piece of the information data file;

receiving a delivery request of the streaming delivery of specific information data from the terminal device;

checking if the information data file containing requested information data of which the streaming delivery is requested by the delivery request is recorded by the recording;

sending the delivery request for requesting the streaming delivery of the requested information data to the delivering apparatus if the information data file containing the requested information data is not recorded by the recording;

sending a file transmission request for requesting a transmission of requested information data file containing the requested information data out of the information data file held by the delivering apparatus if the requested information data file containing the requested information data is not stored by the recording;

receiving the requested information data file sent from the delivering apparatus in response to the file transmission request, and in the data communication method, the recording records the requested information data file received by the receiving.

BRIEF EXPLANATION OF THE DRAWINGS

A complete appreciation of the present invention and many of the attendant advantages thereof will be readily obtained as the same becomes better understood by reference to the following detailed description when considered in connection with the accompanying drawings, wherein:

FIG. 9 is a block diagram showing the process according to the eighth embodiment of the invention.

DESCRIPTION OF THE PREFERRED EMBODIMENT

Embodiment 1

Figure 1:
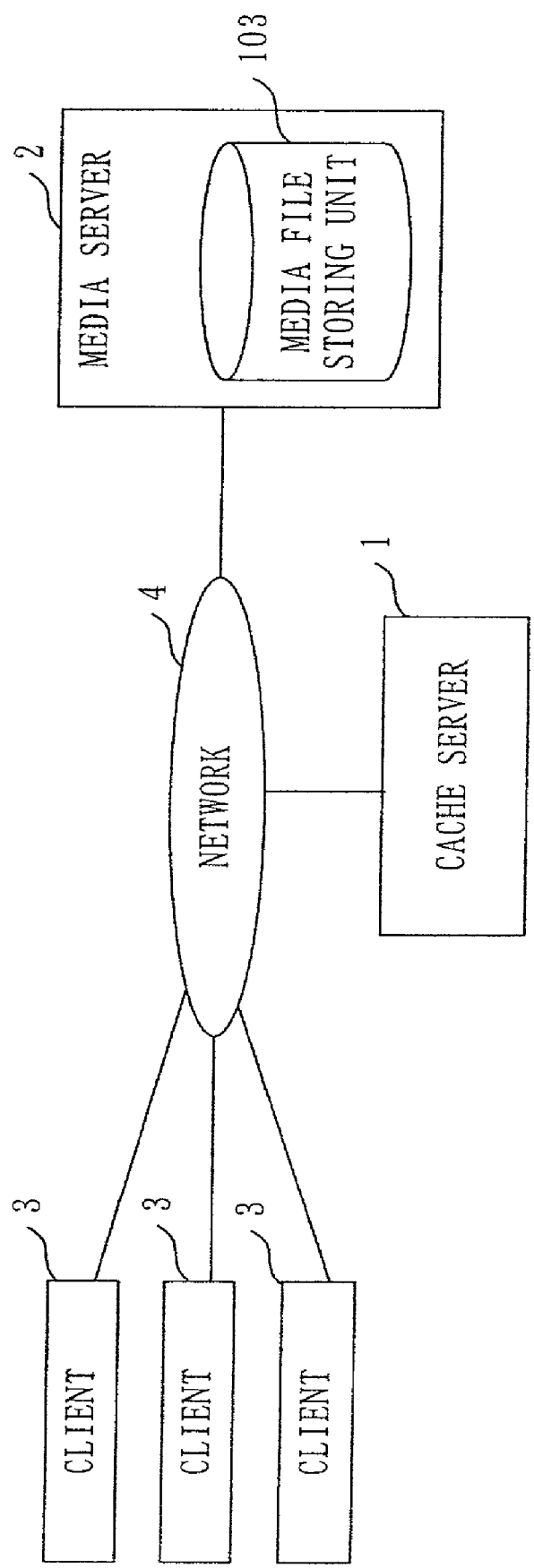
FIG. 1 shows a configuration of a system according to the present invention.

FIG. 1 is a configuration showing network configuration to which a cache server of the invention is applied.

A media server 2, a client 3, a cache server 1 are connected to a network 4. This network 4 includes any kinds of communication tools regardless of wired or wireless such as the Internet, the digital TV networks, satellite communication. One network can be connected to multiple clients, media servers, and cache servers, and further, multiple networks can be connected to each device.

The media server 2 holds at least one media file in a media file storing unit 103. The media server 2 receives a request from the client 3 through the network 4, and performs streaming delivery to the client 3 using the media file. At this time, the data for the streaming delivery is referred to as streaming data.

The data, actually, delivered from the media server 2 is referred to as delivered streaming data.

The media file stored in the media file storing unit 103 of the media server 2 may contain multiple pieces of related streaming data. Concretely, one media file includes multiple pieces of streaming data having the same contents but different qualities, or one media file includes multi-angle video data taken from multiple angles or static image data related to a motion picture, and so on.

Further, the streaming data is mainly data having a certain time period such as video or sound, however, the streaming data can be static data such as static image or text.

The media server 2 corresponds to a delivering apparatus, the streaming data corresponds to information data and the media file corresponds to an information data file.

The client 3 sends a request for streaming delivery to the media server 2 through the network 4, and the client as well receives, reproduces, and displays the streaming data delivered from the media server 2.

The client 3 corresponds to a terminal device.

Further, the streaming data of which the streaming delivery is requested corresponds to requested information data.

The cache server 1 stores the media file or the streaming data requested by the client 3 in the cache, and performs streaming delivery in response to the delivery request by the client using the media file or the streaming data stored in the cache.

The media file stored in the cache is called as a cache file, and the streaming data stored in the cache is called as cache data.

The cache server 1 corresponds to a data communication apparatus.

Figure 2:
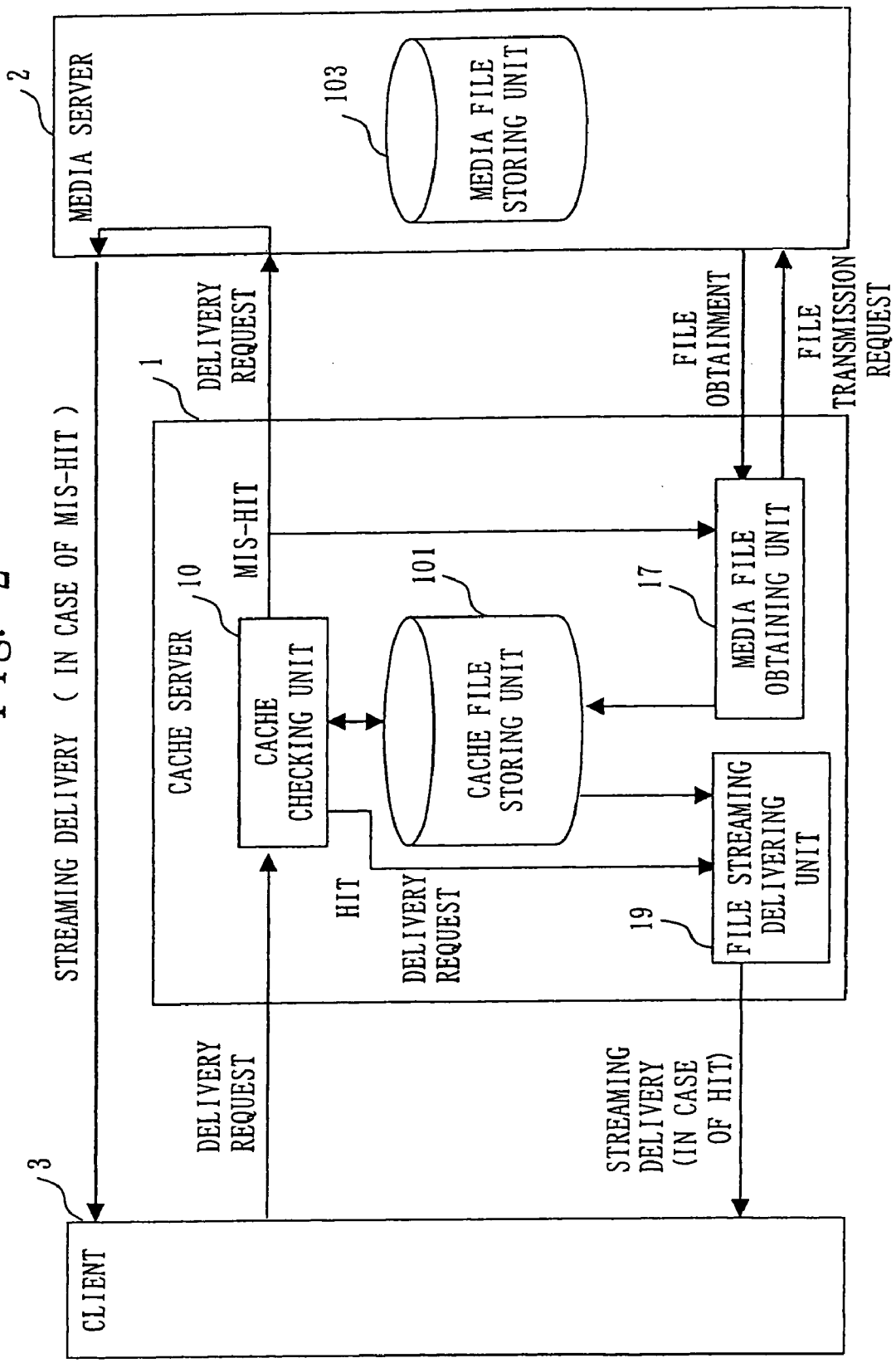
FIG. 2 is a block diagram showing the process according to the first embodiment of the invention.

The following explains an internal configuration of the cache server 1 in reference to FIG. 2.

The cache server 1 includes a cache checking unit 10, a media file obtaining unit 17, a file streaming delivering unit 19, and a cache file storing unit 101.

On receiving a delivery request from the client 3, the cache checking unit 10 checks if the media file including the streaming data requested by the client 3 is stored as the cache file in the cache data storing unit 101.

Further, the cache checking unit 10 also manages information of the location of the streaming data requested by the client 3. Here, the information of the location means a name of the server, a name of media file, and so on.

When the media file including the streaming data requested by the client 3 is stored in the cache file storing unit 101 as a cache file, the cache checking unit 10 calls the file streaming delivering unit 19 in order for delivery of the requested streaming data. When the media file including the streaming data requested by the client 3 is not stored in the cache file storing unit 101 as the cache file, the cache checking unit 10 sends the delivery request from the client to the media server 2, makes the media server 2 perform the streaming delivery to the client, and at the same time, obtains the media file as the cache file by calling the media file obtaining unit 17.

Here, the cache checking unit 10 corresponds to a delivery request receiving unit and a data checking unit.

The media file obtaining unit 17 obtains the media file from the media server 2 through the network 4 based on the location information issued from the cache checking unit 10.

Concretely, when the media file including the streaming data is not stored in the cache file storing unit 101, the media file obtaining unit 17 sends a media file transmission request (file transmission request) for requesting a transmission of the media file including the streaming data requested by the client 3 to the media server 2, and receives the media file from the media server 2 as a response to the media file transmission request. The media file including the requested streaming data corresponds to a requested information data file.

Further, the media file obtaining unit 17 corresponds to a file transmission requesting unit and a file receiving unit.

The file streaming delivering unit 19 performs the streaming delivery to the client 3 using the cache file stored in the cache file storing unit 101 in response to the delivery request from the client 3.

The file streaming delivering unit 19 corresponds to a data delivering unit.

The cache file storing unit 101 stores the media file obtained by the media file obtaining unit 17 as a cache file.

The cache file storing unit 101 corresponds to a file caching unit.

The cache server 1 can be implemented by, for example, a computer having a CPU such as a micro-processor, a recording unit such as a semiconductor memory, a magnetic disk, and a communication unit, not shown in the figure. The recording unit stores a program for implementing functions of each element included in the cache server 1, the CPU can control the operation of the cache server 1 by reading the program, which enables to implement the function of each element.

The operation will be explained in the following.

First, the client 3 issues the delivery request for an arbitrary media file to the media server 2.

When the client 3 requests the streaming delivery from the media server 2, the delivery request always reaches the cache server 1.

The cache checking unit 10 receives the delivery request sent from the client 3 and checks if the media file requested by the client 3 is stored in the cache file storing unit 101 as the cache file or not.

When the media file requested by the client is stored in the cache file storing unit 101 as the cache file (in case of hit), the file streaming delivering unit 19 performs the streaming delivery to the client 3 using the cache file stored in the cache file storing unit 101 instead of the media server 2.

When the cache checking unit 10 detects the media file is not stored as the cache file, the delivery request is transferred to the media server 2 as a case of miss-hit of the cache.

At this time, the media server 2 receives the request from the client 3 and performs the streaming delivery of the corresponding streaming data. The streaming data is delivered from the media server, and the client receives and reproduces the streaming data.

In parallel with the above operation, the cache checking unit 10 informs the media file obtaining unit 17 of information specifying the media file (a name of the media server 2, an IP address, a name and a size of the media file, etc) and requests to obtain the media file.

The media file obtaining unit 17 sends the media file transmission request to the media server 2 based on the information received from the cache checking unit 10, receives the corresponding media file from the media server 2 as the cache file, and stores the cache file in the cache file storing unit 101.

Here, the media file which is received by the media file obtaining unit 17 and stored as the cache file in the cache file storing unit 101 includes the streaming data requested by the client 3 and data related to the streaming data.

Namely, the cache server 1 holds the file having the same contents as the media file held by the media server 2.

Accordingly, when another client sends the delivery request for the media file to the media server 2 after storing the media file obtained by the media file obtaining unit 17 being stored in the cache file storing unit 101 through the above process, the cache checking unit 10 judges this case as "hit," since the media file is stored as the cache file. The delivery request from the client is informed to the file streaming delivering unit 19.

Then, the file streaming delivering unit 19 reads the cache file and performs the streaming delivery to the client.

As discussed above, the hit ratio of the cache can be improved by storing the file having the same contents as the media file held by the media server in the cache server as the cache file, and it is possible to effectively perform the streaming delivery from the cache server in response to the client's request.

Namely, since the media file including plural related streaming data as well as the streaming data requested by the client can be stored in the cache, the hit ratio of the cache can be improved, and it is possible to effectively perform the streaming delivery from the cache server in response to the client's request with the same quality as the media server.

Further, when the media file is stored in the cache server as the cache file, if the client issues the delivery request for the media file to the media server, the cache server performs the streaming delivery instead of the media server, which brings an advantage to extremely reduce the load of the media server for delivery.

Further, by setting the cache server at an ISP, etc., it becomes possible for the client to reproduce the streaming data delivered from the cache server without degrading its quality even when the streaming data is included in the media file stored at the media server which is connected to the client through the network having a low bandwidth.

At this time, when the cache server is located at the ISP, if plural clients connected to the ISP issue the delivery request for the same media file to the media server, data transferred between the cache server and the media server is only one media file, which brings an advantage to extremely reduce the load of the network Embodiment 2

In the above first embodiment, the media file is stored as the cache file. The following shows another embodiment which facilitates to construct a system when the bandwidth of the network between the media server and the cache server is limited or construct a large-scaled system in which many cache servers are connected to one or a small number of the media servers.

Figure 3:
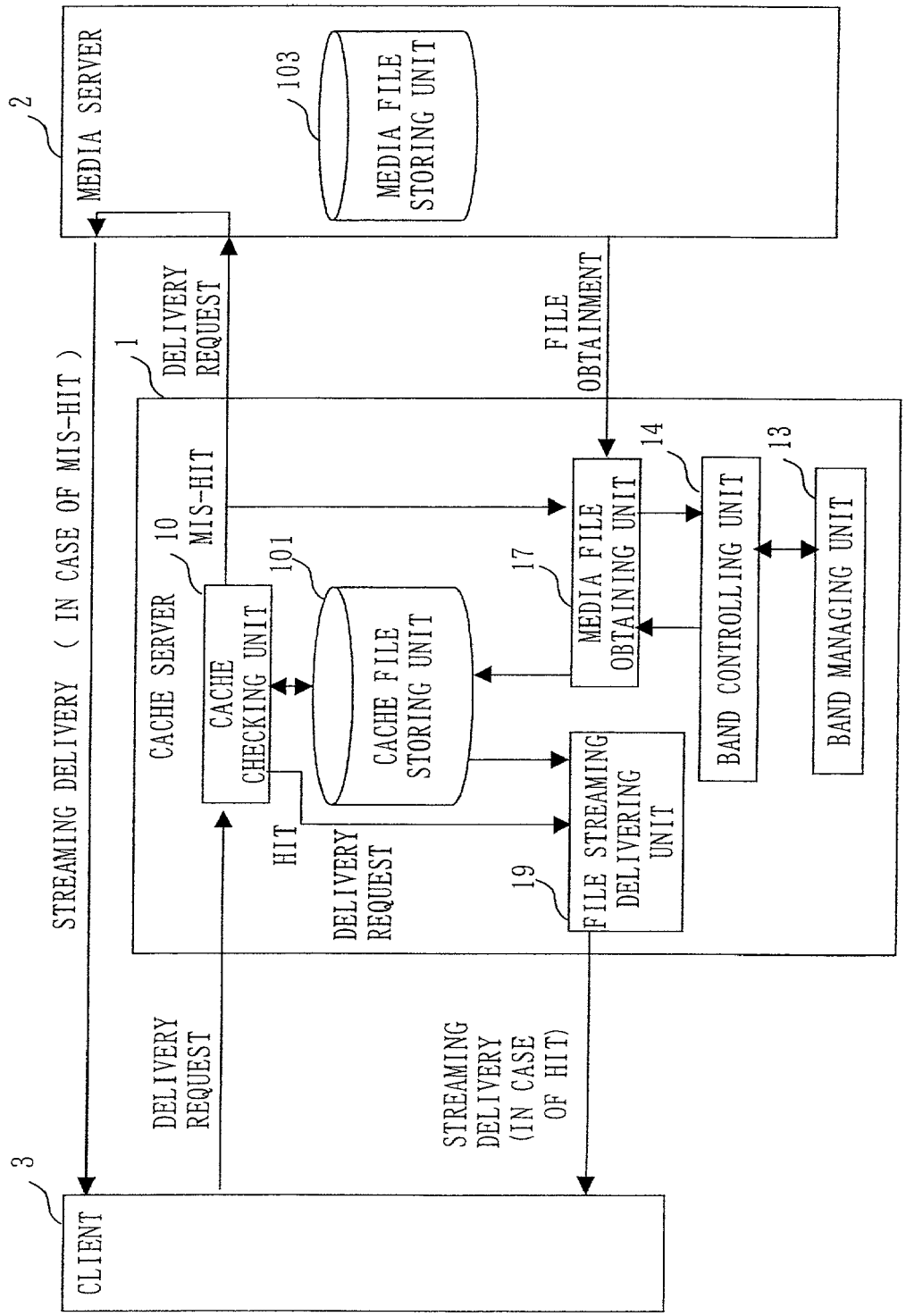
FIG. 3 is a block diagram showing the process according to the second embodiment of the invention.

FIG. 3 shows a processing flow according to the second embodiment.

In the figure, 1 shows a cache server, 2 shows a media server, 3 show a client, 10 shows a cache checking unit, 101 shows a cache file storing unit, 19 shows a file streaming delivering unit, 17 is a media file obtaining unit, 13 is a band managing unit, 14 is a band controlling unit, and 103 is a media file storing unit. Namely, the band managing unit 13 and the band controlling unit 14 are added to the configuration of the first embodiment.

The band managing unit 13 manages a status of a usage of the network available to the media file obtaining unit 17 in case of obtaining the media file from the media server 2.

The band managing unit 13 corresponds to a communication rate checking unit.

The band controlling unit 14 determines a transfer rate for obtaining the media file by the media file obtaining unit 17 within the available bandwidth of the network.

The band controlling unit 14 corresponds to a communication rate setting unit. And the transmission rate determined by the band controlling unit 14 is referred to as a set communication rate.

Next, an operation will be explained.

An operation of the cache checking unit 10 is the same as one of the first embodiment. A process after an operation of the media file obtaining unit 17 differs from the first embodiment, and the operation will be explained.

The media file obtaining unit 17 accesses the media server based on the information received from the cache checking unit 10 and stores the media file as the cache file.

Before obtaining the media file by the media file obtaining unit 17, the band controlling unit 14 asks the band managing unit 13 of the current status of the usage of the network. The band managing unit 13 replies to the band controlling unit 14 with information of an empty bandwidth of the network.

The band controlling unit 14 determines the transmission rate for obtaining the media file so as to be lower rate than an empty bandwidth of the network, and the determined transmission rate is informed to the media file obtaining unit 17.

The media file obtaining unit 17 receives the media file at the transmission rate informed by the band controlling unit 14.

At this time, it is possible to previously determine the transmission rate for obtaining the media file. Namely, when the empty bandwidth replied from the band managing unit 13 is lower than the predetermined transmission rate, the transmission rate lower than the bandwidth replied from the band managing unit 13 is used, and when the empty bandwidth is sufficiently higher than the predetermined transmission rate, the predetermined transmission rate is used. By doing this, it becomes possible to obtain another media file during the media file is being obtained.

Through the above process, the media file is stored as the cache file, so that an operation in case that another client issues the delivery request for the media file to the media server 2 will be the same as the first embodiment.

As described above, in addition to the advantage brought by the first embodiment, the present embodiment enables to effectively share the limited bandwidth of the network in case of simultaneously obtaining plural media files.

Embodiment 3

In the first embodiment, the media file is stored as the cache file. Next, another embodiment will be explained in which the cache server 1 and the media server 2 are connected through plural networks such as optical communication network and the Internet, the satellite communication network and the Internet, and so on.

Figure 4:
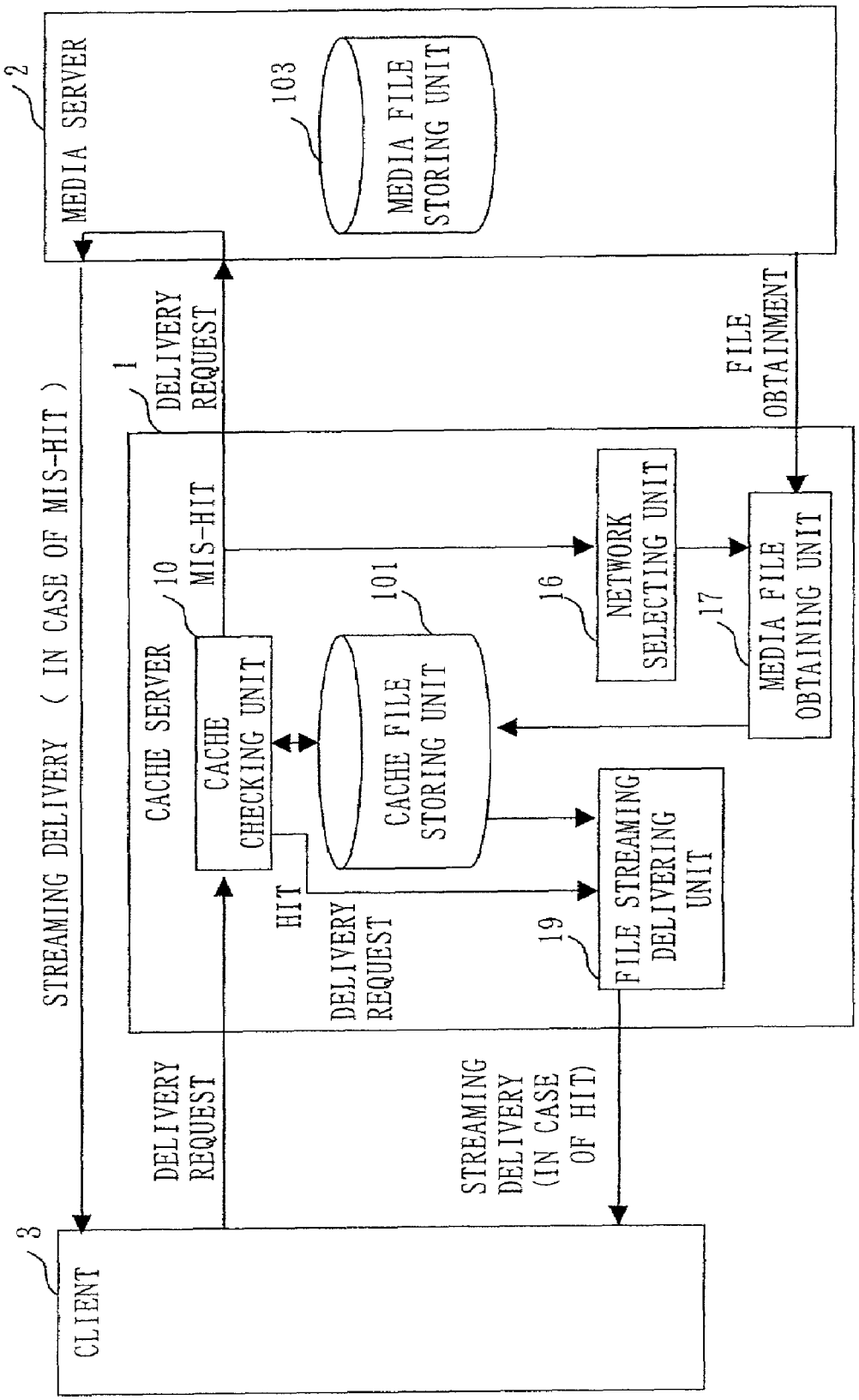
FIG. 4 is a block diagram showing the process according to the third embodiment of the invention.

FIG. 4 shows a processing flow of the third embodiment of the invention.

In the figure, 1 shows a cache server, 2 shows a media server, 3 show a client, 10 shows a cache checking unit, 101 shows a cache file storing unit, 19 shows a file streaming delivering unit, 17 is a media file obtaining unit, 16 is a network selecting unit, and 103 is a media file storing unit. Namely, the network selecting unit 16 is added to the configuration of the first embodiment.

Further, the band managing unit 13 and the band controlling unit 14 described in the second embodiment can be additionally used, so that the media file can be obtained with managing the bandwidth of plural networks under controlling the bandwidth.

When the media server 2 and the cache server 1 are connected through plural networks, the network selecting unit 16 selects an optimal network to be used out of the plural networks. The network selecting unit 16 selects the network based on an empty bandwidth of the network, or in another way, the network to be used is previously determined in a matrix form according to time required for obtaining, and the network selecting unit 16 selects the network based on the matrix.

The network selecting unit corresponds to a communication channel selecting unit.

Next, an operation will be explained.

The operation of the cache checking unit 10 is the same as one in the first embodiment. Since the operation of process after a step when the cache checking unit 10 judges as miss-hit differs from the first embodiment, the following explains the operation after this step.

When the cache checking unit 10 recognizes that the media file is not stored as the cache file, the cache checking unit 10 judges as miss-hit and transfers the delivery request from the client to the media server 2. In this case, the streaming data is delivered from the media server 2, and the client 3 receives and reproduces the streaming data.

In parallel with the above operation, the cache checking unit 10 informs the network selecting unit 16 of information which specifies the media file (a name of the media server 2, an IP address, a name and size of the media file, etc.) and requests to obtain the media file.

The network selecting unit 16 selects an optimal network from the plural networks which connect the cache server and the media server.

The network can be selected based on a network list in which a network to be used is previously registered, or in another way, the network can be selected based on the response speed at each network after accessing the media server through each network. Further, when a network suitable to deliver the data in wide area such as satellite line is used, it becomes possible to effectively use the bandwidth by preferentially setting this kind of network.

The network selecting unit 16 informs the media file obtaining unit 17 of the selected network and the information which specifies the media file (a name of the media server 2, IP address, a name and size of the media file, etc.) notified from the cache checking unit 10.

The media file obtaining unit 17 accesses the media server 2 through the network selected by the network selecting unit and obtains the media file to store as the cache file.

Through the above process, the media file has been stored as the cache file, the operation of a case that another client sends the delivery request for the media file to the media server is the same as one of the first embodiment.

As discussed above, in addition to the advantage of the first embodiment, the present embodiment brings an advantage to make the time required for obtaining the media file optimal, since in the embodiment, it is possible to effectively use plural networks through which the cache server and the media server are connected.

Further, by utilizing the band managing unit 13 and the band controlling unit 14 described in the second embodiment, it is possible to effectively use the lines which are mainly used for data transmission such as the satellite line or TV broadcasting line. In particular, by taking the data delivery using the wireless communication such as the satellite line, it is possible to multicast the media file to the cache servers spread in the wide area, so that such data delivery is very effective compared to the wired data transmission.

Embodiment 4

In the first embodiment, the media file is stored as the cache file. The following shows another embodiment to economize the capacity of the cache.

Figure 5:
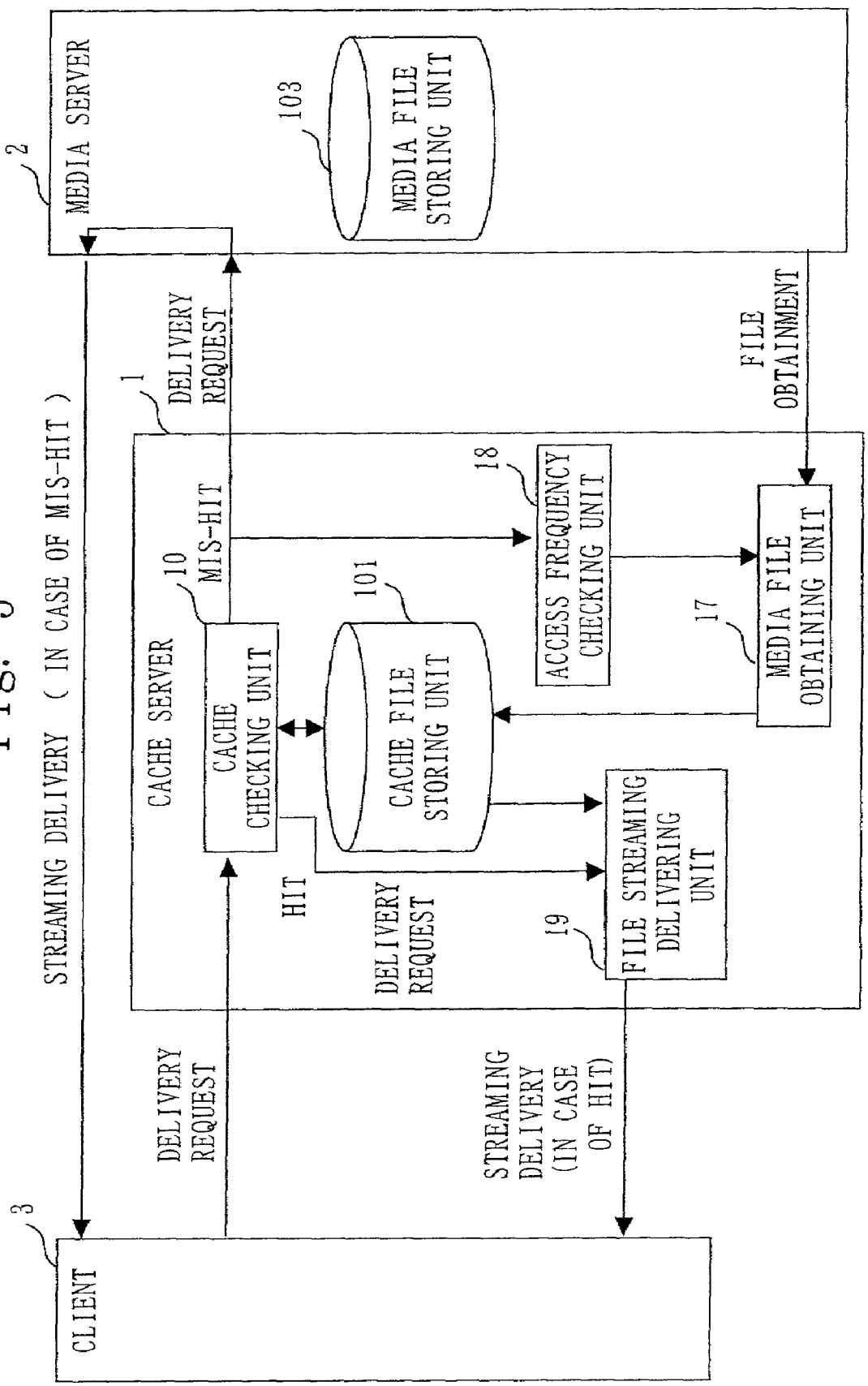
FIG. 5 is a block diagram showing the process according to the fourth embodiment of the invention.

FIG. 5 shows a processing flow according to the fourth embodiment of the present invention. In the figure, 1 shows a cache server, 2 shows a media server, 3 shows a client, 10 shows a cache checking unit, 101 shows a cache file storing unit, 17 shows a media file obtaining unit, 18 shows an access frequency checking unit, 19 shows a file streaming delivering unit, and 103 shows a media file storing unit. Namely, the access frequency checking unit 18 is added to the configuration of the first embodiment.

Further, the band managing unit 13 or the band controlling unit 14 described in the second embodiment can be used, so that it becomes possible to obtain the media file with managing the bandwidth of plural networks.

The access frequency checking unit 18 increments its value by 1 every time the client 3 issues the delivery request for the media file to the media server 2 and stores the delivery request for the media file. Further, at this time, if the number of delivery requests in a predetermined past time period is counted, the access frequency checking unit 18 can deal with the reduction of the frequency of access to the media file as time passes.

The access frequency checking unit 18 corresponds to a delivery request counting unit.

Next, an operation will be described.

The operation of the cache checking unit 10 is the same as one in the first embodiment. Since the operation of process after a step when the cache checking unit 10 judges as miss-hit differs from the first embodiment, the following explains the operation after this step.

When the cache checking unit 10 recognizes that the media file is not stored as the cache file, the cache checking unit 10 judges as miss-hit and transfers the delivery request from the client to the media server 2. In this case, the streaming data is delivered from the media server 2, and the client 3 receives and reproduces the streaming data.

In parallel with the above operation, the cache checking unit 10 informs the network selecting unit 16 of information which specifies the media file (a name of the media server 2, an IP address, a name and size of the media file, etc.) and requests to obtain the media file.

The access frequency checking unit 18 checks the information of miss-hit obtained from the cache checking unit 10 and stores the number of accesses during a predetermined time period. Namely, the number of accesses is counted every time the cache checking unit 10 judges as miss-hit and the delivery request sent from the client 3 is sent to the media server 2. The access frequency checking unit 18 instructs the media file obtaining unit 17 to obtain the media file only when the number of accesses exceeds a threshold value.

On receiving an instruction to obtain the media file from the access frequency checking unit 18, the media file obtaining unit 17 accesses the media server 2 and obtains the media file to store as the cache file.

Since the media file has been stored as the cache file through the above process, the operation of a case that another client sends the delivery request for the media file to the media server becomes the same as one of the first embodiment.

As discussed above, in addition to the advantage brought by the first embodiment, the present embodiment brings an advantage that the hit ratio of the cache is improved, since media file which has been accessed many times is stored, and that the cache file storing unit 101 can be effectively used, since media files of which hit ratio is high are stored in the cache as the cache file.

Embodiment 5

In the first embodiment, the media file is stored as the cache file. The following shows another embodiment which utilizes the bandwidth of the network between the cache server and the media server at maximum, which enables to store the media file as the cache file as promptly as possible.

Figure 6:
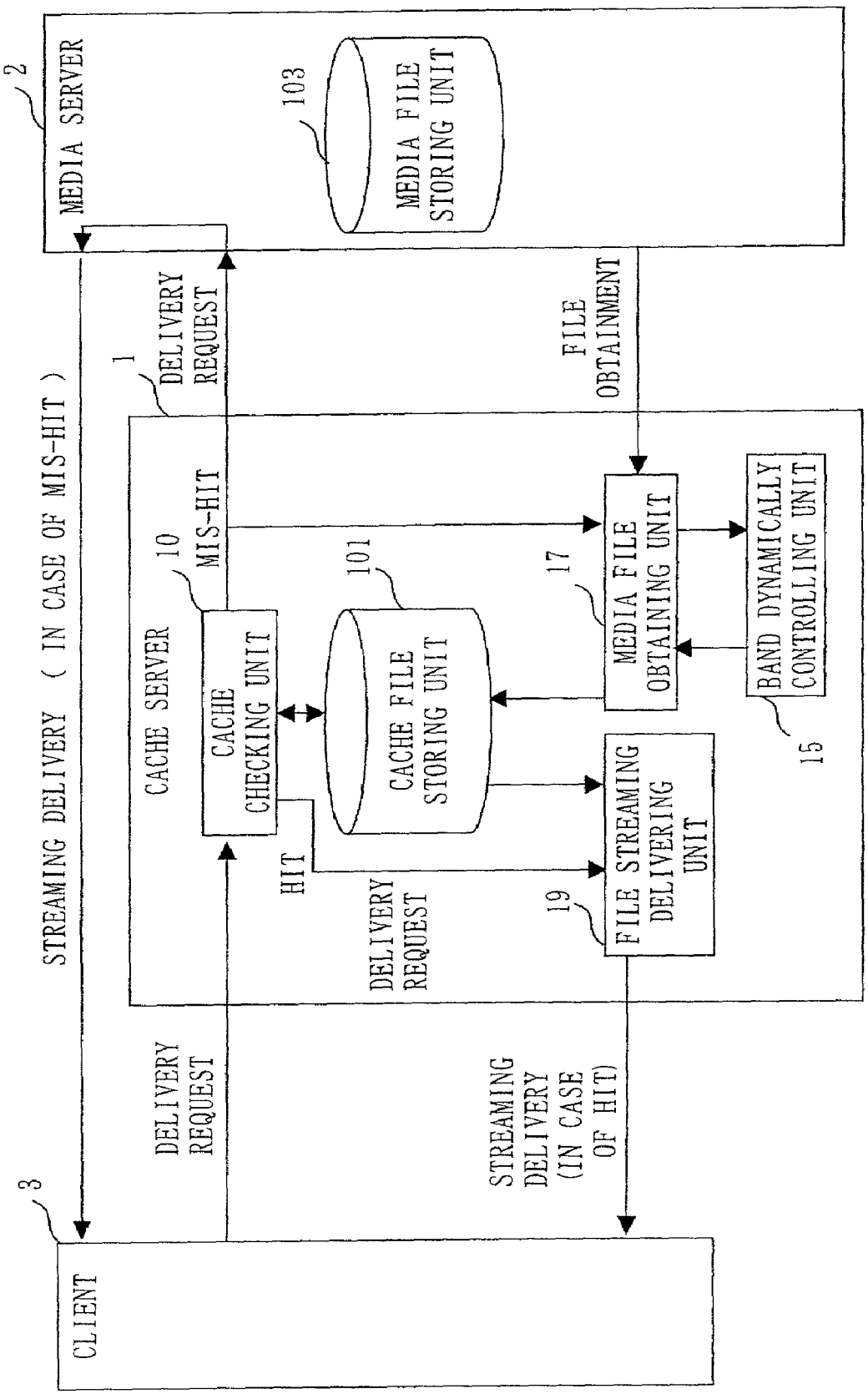
FIG. 6 is a block diagram showing the process according to the fifth embodiment of the invention.

FIG. 6 shows a processing flow according to the fifth embodiment of the present invention. In the figure, 1 shows a cache server, 2 shows a media server, 3 shows a client, 10 shows a cache checking unit, 101 shows a cache file storing unit, 15 shows a band dynamically controlling unit, 17 shows a media file obtaining unit, 19 shows a file streaming delivering unit, and 103 shows a media file storing unit. Namely, the band dynamically controlling unit 15 is added to the configuration of the first embodiment.

The band dynamically controlling unit 15 observes the bandwidth of the network used for obtaining the media file from the media server 2 by the media file obtaining unit 17 and dynamically determines a transmission rate according to the fluctuation in the bandwidth.

The band dynamically controlling unit 15 corresponds to a communication rate dynamically setting unit.

Next, an operation will be described.

The operation of the cache checking unit 10 is the same as one in the first embodiment. Since the operation of process after a step of the operation of the media file obtaining unit 17 differs from the first embodiment, the following explains the operation after this step.

The media file obtaining unit 17 accesses the media server based on the information received from the cache checking unit 10 and stores the media file as the cache file.

During the media file obtaining unit 17 accesses the media server, the band dynamically controlling unit 15 observes the transmission rate and dynamically changes and determines the transmission rate by changing it according to variation of conditions. That is, for example, observing congestion of the network between the media server and the cache server or observing the response from the media server, the band dynamically controlling unit 15 determines the transmission rate based on the current operation status of the CPU, the hard disk, and the memory of the cache server. Generally, when the transmission rate is high, the operation time of the CPU or the bandwidth of the network in a certain time period is used as a criteria for determining the transmission rate. Therefore, it is necessary to control the transmission rate by keeping these values within a predetermined value.

In this way, the media file obtaining unit 17 receives the media file according to the transmission rate dynamically determined by the band dynamically controlling unit 15.

Since the media file has been stored as the cache file through the above process, the operation of a case that another client sends the delivery request for the media file to the media server is the same as one of the first embodiment.

As described above, in addition to the advantage brought by the first embodiment, the present embodiment brings an advantage that it becomes possible to utilize the bandwidth of the network at maximum on obtaining plural media files and eliminate a waste of the network source by observing the status of the network with the cache server. Further, the cache server also observes its own resource, so that the present embodiment brings another advantage that the substantial function of the cache server such as the streaming delivery will not be affected.

Embodiment 6

Figure 7:
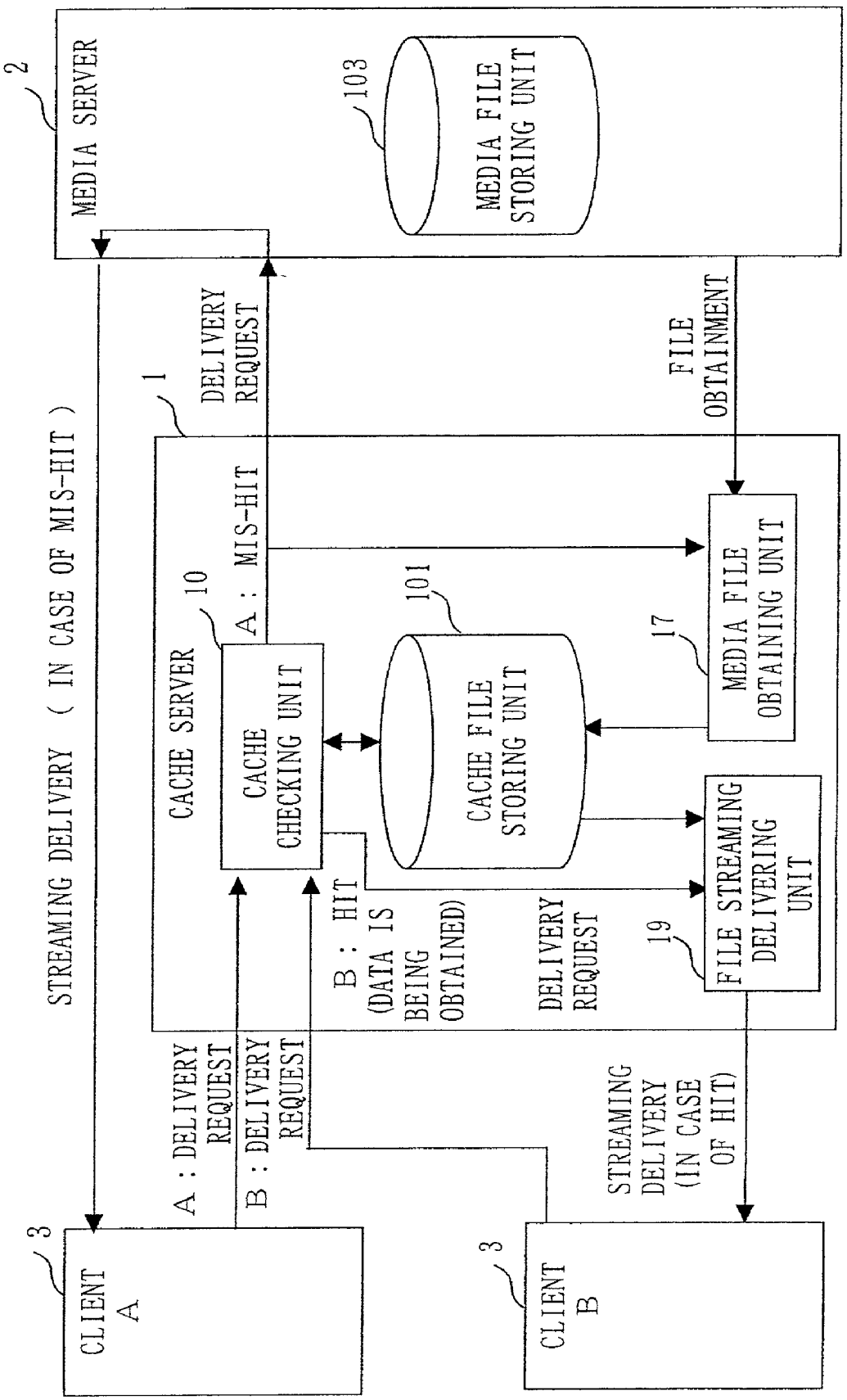
FIG. 7 is a block diagram showing the process according to the sixth embodiment of the invention.

FIG. 7 shows a processing flow according to the sixth embodiment of the present invention.

In the figure, 1 shows a cache server, 2 shows a media server, 3 shows a client, 10 shows a cache checking unit, 17 shows a media file obtaining unit, 19 shows a file streaming delivering unit, 101 shows a cache file storing unit, and 103 shows a media file storing unit.

The following will explain an operation.

First, a client A issues the delivery request for streaming data included in an arbitrary media file to the media server 2. As the delivery request is sent through the cache server 1, the cache server 1 first receives the delivery request, and the cache checking unit 10 checks if the media file including the streaming data requested by the client A is stored in the cache file storing unit 101 as the cache file.

When the cache checking unit 10 recognizes that the media file including the streaming data requested is not stored as the cache file, the cache checking unit 10 judges as miss-hit and transfers the delivery request from the client to the media server 2. In this case, the streaming data is delivered from the media server 2, and the client A receives and reproduces the streaming data.

In parallel with the above operation, the cache checking unit 10 informs the media file obtaining unit 17 of information which specifies the media file (a name of the media server 2, an IP address, a name and size of the media file, etc.) and requests to obtain the media file.

The media file obtaining unit 17 accesses the media server 2 based on the information received from the cache checking unit 10, obtains the media file to store as the cache file.

If another client B issues the delivery request for the media file requested by the client A to the media server, since the storage of the media file as the cache file has not finished, the cache checking unit 10, generally, does not judge as hit.

Here, by not adding the check of the size of the cache file and the media file to the standard for judging hit/miss-hit of the cache by the cache checking unit 10, the delivery request from the client B is notified to the file streaming delivering unit 19.

After the media file is stored in the cache file storing unit 101, the file streaming delivering unit 19 reads the cache file and performs the streaming delivery to the client B.

As discussed above, even if the media file is being stored at the cache server as the cache file, when the client B issues the delivery request for the media file to the media server, the cache server performs the streaming delivery instead of the media server. Therefore, as soon as the data transmission of the cache file from the media server is started, the cache of the corresponding media file becomes hit. Consequently, in addition to the advantage described in the first embodiment, the embodiment brings an advantage that the convenience for the client can be increased and the delivery load of the media server can be further reduced.

Embodiment 7

Figure 8:
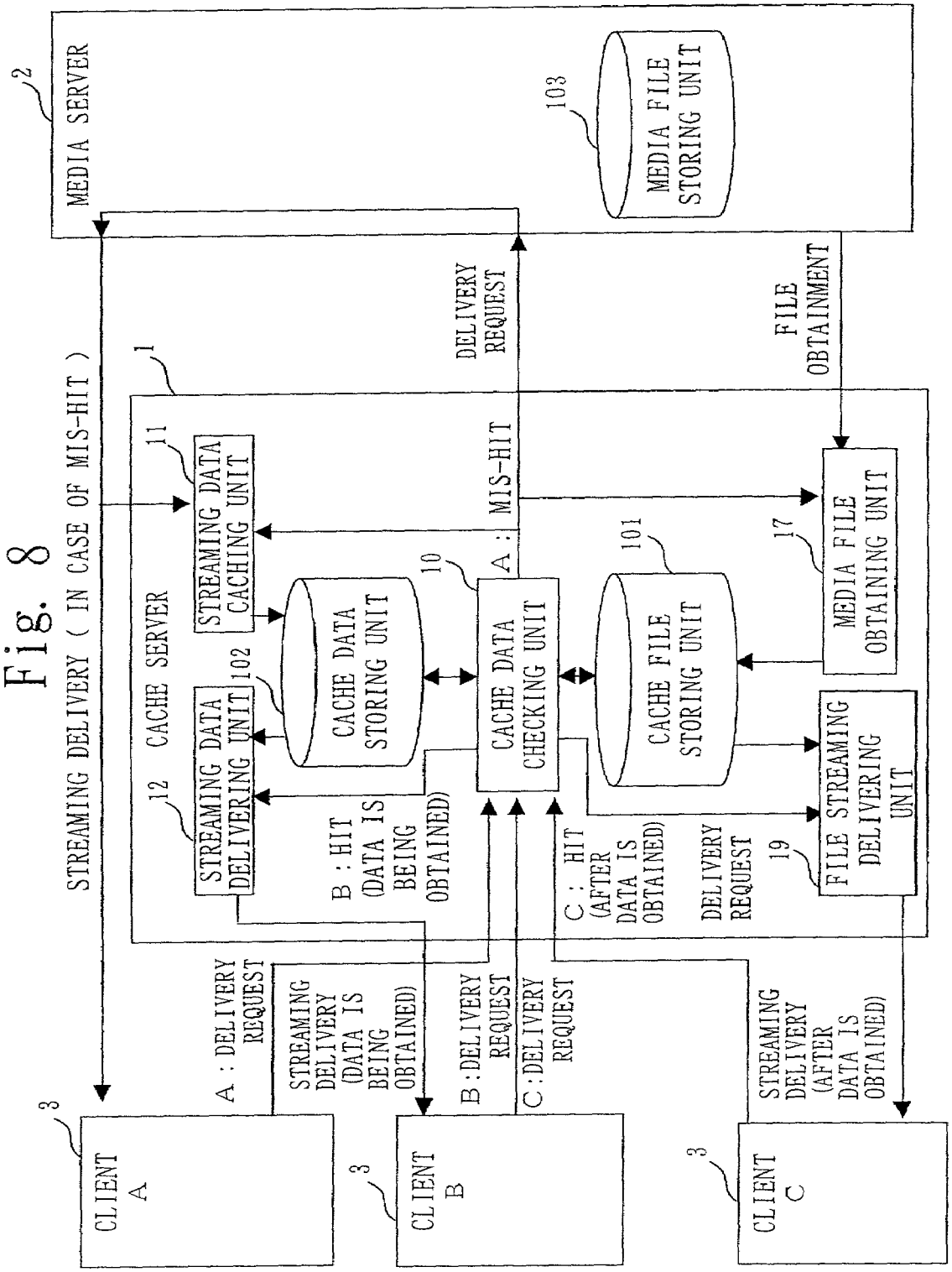
FIG. 8 is a block diagram showing the process according to the seventh embodiment of the invention.

FIG. 8 shows a processing flow according to the seventh embodiment of the present invention.

In the figure, 1 shows a cache server, 2 shows a media server, 3 shows a client, 10 shows a cache checking unit, 11 shows a streaming data caching unit, 12 shows a streaming data delivering unit, 17 shows a media file obtaining unit, 19 shows a file streaming delivering unit, 101 shows a cache file storing unit, and 102 shows a cache data storing unit, and 103 shows a media file storing unit. Namely, the streaming data caching unit 11, the streaming data delivering unit 12, and the cache data storing unit 102 are added to the configuration of the first embodiment.

The streaming data caching unit 11 receives the streaming data delivered from the media server 2 and caches the received delivered streaming data.

The streaming data caching unit 11 corresponds to an information data receiving unit.

The streaming data delivering unit 12 performs the streaming delivery to the client using the cache data stored in the cache data storing unit 102 in response to the delivery request from the client. The streaming data delivering unit 12 can also perform the streaming delivery of the streaming data delivered from the media server 2 by directly receiving the delivered streaming data from the streaming data caching unit 11.

The streaming data delivering unit 12 corresponds to a data delivering unit.

The cache data storing unit 102 stores the delivered streaming data stored by the streaming data caching unit 11 as the cache data.

The cache data storing unit 102 corresponds to an information data caching unit.

An operation will be explained in the following.

First, the client A issues the delivery request for streaming data included in an arbitrary media file to the media server 2. As the delivery request is sent through the cache server, the cache server first receives the delivery request, and the cache checking unit 10 checks if the media file including the streaming data requested by the client is stored in the cache file storing unit 101 as the cache file or the cache data storing unit 102 as the cache data.

When the cache checking unit 10 recognizes that the media file including the streaming data requested by the client A is not stored in the cache file storing unit 101 as the cache file, and then the cache checking unit 10 checks if the streaming data is stored in the cache data storing unit 102 as the cache data. When the streaming data is stored in neither of them, the cache checking unit 10 judges as miss-hit and transfers the delivery request from the client to the media server 2. In this case, the streaming data is delivered from the media server 2, and the client A receives and reproduces the streaming data.

In parallel with the above operation, the cache checking unit 10 instructs the streaming data caching unit 11 to store the streaming data of the media file, and further the cache checking unit 10 informs the media file obtaining unit 17 of information which specifies the media file (a name of the media server 2, an IP address, a name and size of the media file, etc.) and requests to obtain the media file.

The streaming data caching unit 11 and the media file obtaining unit 17 start caching the delivered streaming data and the media file in their respective ways and in parallel.

If another client B issues the delivery request for the corresponding media file requested by the client A to the media server, since storing the media file in the cache file storing unit 101 as the cache file has not finished, the cache checking unit 10 judges as miss-hit and the cache checking unit 10 judges the cache data which is being stored in the cache data storing unit 102 as hit. The cache checking unit 10 requests the delivery of the cache data (received requested information data) which is being stored and corresponds to the requested media file.

The streaming data delivering unit 12 performs the streaming delivery from a part of the streaming data, which has been already stored in the cache data storing unit 102, sequentially to the client B.

As time passes further, the processes of obtaining the media file by the media file obtaining unit 17 and storing the obtained file in the cache file storing unit 101 finish. If another client C issues the delivery request for the media file requested by the client A and the client B to the media server, the cache checking unit 10 judges as hit and requests the delivery to the client C from the file streaming delivering unit 19.

The file streaming delivering unit 19 reads the cache file and performs the streaming delivery to the client C.

As discussed above, when the client issues the delivery request for an arbitrary media file to the media server, the cache server stores the corresponding media file not only as the cache file but also as the cache data, the cache server performs the streaming delivery instead of the media server in response to the delivery request from another client. Accordingly, in addition to the advantage brought by the first embodiment, the present embodiment brings an advantage that the delivery load of the media server can be greatly reduced, when the client issues the delivery request for the stored media file.

Further, since the cache data and the cache file are stored respectively, if the access frequency checking unit 18 is also used, the streaming data can stored in two forms based on the frequency of the access to the streaming data. Namely, in case the number of accesses is small, the streaming data is stored as the cache data, and on the contrary, in case the number of accesses is large, the media file is obtained and stored as the cache file. Accordingly, the convenience for the client can be further increased.

Further, since the cache data and the cache file are stored respectively, the streaming data caching unit 11 can store the streaming data in the cache data storing unit 102 as the cache data simultaneously to the delivery to the first client A, independently from the operation of storing the media file, even if the band controlling unit 14 sets the transmission rate sufficiently low so as not to take the load on the network, and the media file obtaining unit 17 takes time to obtain the media file in a low transmission rate. Therefore, the embodiment can bring an advantage to improve the hit ratio to the cache data and to provide service with good quality without loading the network.

Embodiment 8

FIG. 9 shows a processing flow according to the eighth embodiment of the present invention.

In the figure, 1 shows a cache server, 2 shows a media server, 3 shows a client, 10 shows a cache checking unit, 11 shows a streaming data caching unit, 12 shows a streaming data delivering unit, 17 shows a media file obtaining unit, 19 shows a file streaming delivering unit, 20 shows a cache data deleting unit, 101 shows a cache file storing unit, and 103 shows a media file storing unit. Namely, the cache data deleting unit 20 is added to the configuration of the seventh embodiment.

When the media file obtaining unit 17 obtains the media file from the media server 2, and the cache file storing unit 101 stores the media file as the cache file, and if the cache data having the same contents as the streaming data included in the cache file has been already stored in the cache data storing unit 102, the cache data deleting unit 20 deletes duplicated cache data from the cache data storing unit 102.

The cache data deleting unit 20 corresponds to a data deleting unit.

An operation will be explained in the following.

First, the client A issues the delivery request for streaming data included in an arbitrary media file to the media server 2. As the delivery request is sent through the cache server, the cache server receives the delivery request, and the cache checking unit 10 checks if the media file including the streaming data requested by the client is stored in the cache file storing unit 101 as the cache file or the cache data storing unit 102 as the cache data.

When the cache checking unit 10 recognizes that the media file including the streaming data requested by the client A is not stored in the cache file storing unit 101 as the cache file, and then the cache checking unit 10 checks if the streaming data is stored in the cache data storing unit 102 as the cache data. When the streaming data is stored in neither of them, the cache checking unit 10 judges as miss-hit and transfers the delivery request from the client to the media server 2.

In this case, the streaming data is delivered from the media server 2, and the client A receives and reproduces the streaming data.

In parallel with the above operation, the cache checking unit 10 instructs the streaming data caching unit 11 to receive and store the streaming data of the media file, and further the cache checking unit 10 informs the media file obtaining unit 17 of information which specifies the media file (a name of the media server 2, an IP address, a name and size of the media file, etc.) and requests to obtain the media file.

The streaming data caching unit 11 and the media file obtaining unit 17 start caching the delivered streaming data and the media file in respective ways and in parallel.

If another client B issues the delivery request for the media file requested by the client A to the media server 2, since storing the cache file in the cache file storing unit 101 has not finished, the cache checking unit 10 judges as miss-hit and the cache checking unit 10 judges the cache data which is being stored in the cache data storing unit 102 as hit.

The cache checking unit 10 requests the delivery of the cache data which is being stored and corresponds to the requested media file.

The streaming data delivering unit 12 performs the streaming delivery from a part of the streaming data, which has been already stored in the cache data storing unit 102, sequentially to the client B.

As time passes further, the processes of obtaining the media file by the media file obtaining unit 17 and storing the obtained file in the cache file storing unit 101 finish. Then, the media file obtaining unit 17 instructs the cache data deleting unit 20 to delete the cache data corresponding to the media file (duplicated cache data).

The cache data deleting unit 20 deletes the cache data corresponding to the media file (duplicated cache data) from the cache data storing unit 102.

If another client C issues the delivery request for the media file requested by the client A and the client B to the media server, the cache checking unit 10 judges as hit and requests the file streaming delivering unit 19 to perform the delivery to the client C.

The file streaming delivering unit 19 reads the cache file and performs the streaming delivery to the client C.

As described above, after the cache file is obtained, unnecessary cache data is deleted. Accordingly, in addition to the advantage described in the seventh embodiment, the present embodiment brings an advantage that the memory area of the cache server can be saved and effectively used.

In the foregoing first through eighth embodiments, the data communication apparatus of the present invention has been explained. A data communication method can be implemented using the same processes.

Hereinafter, the characteristics of the cache server apparatus and the caching method will be rementioned in the following.

According to a cache server apparatus and a caching method of the first embodiment, in a streaming delivery system where:

a cache server is located between a client who reproduces streaming media and a media server which delivers a media file;

the cache server checks if a media file requested by the client is stored in the cache server as a cache file;

the cache server delivers the cache file to the client if the cache file is stored;

the cache server caches the media file requested by the client and obtained from the media server in the cache server if the cache file is not store, the cache server includes:

a cache checking unit referring the delivery request for the media file issued by the client to the media server, managing a location of the media file, and checking if the requested media file is stored in the cache server as the cache file;

a file streaming delivering unit performing the streaming delivery to the client from the cache server using the cache file if the media file is stored as the cache file; and a media file obtaining unit obtaining the media file of which the delivery request is issued by the client from the media server as a file.

According to the second embodiment, the cache server apparatus and the caching method includes:

a band managing unit managing a bandwidth of network available for obtaining the media file from the media server; and a band controlling unit determining to obtain the media file at lower transmission rate than the bandwidth which is currently available.

According to the third embodiment, when the cache server and the media server can mutually communicate through plural networks, the cache server apparatus and the caching method includes:

a band managing unit managing each bandwidth of the plural networks connected to the cache server; and a network selecting unit selecting one network of which the band is the least congested for obtaining the media file from the media server.

According to the fourth embodiment, the cache server apparatus and the caching method includes an access frequency checking unit counting the number of delivery requests sent from the client and determining to obtain the media file when the counted number of delivery requests exceeds a predetermined threshold value.

According to the fifth embodiment, the cache server apparatus and the caching method includes a band dynamically controlling unit dynamically adjusting a transmission rate based on the available bandwidth when the cache server obtains the media file as the cache file.

According to the cache server apparatus and the caching method of the sixth embodiment, when the client sends the delivery request for the media file to the media server during the cache server is obtaining the media file from the media server as the cache file, the cache server delivers a part of the cache file, which has been already stored, to the client.

According to the seventh embodiment, the cache server apparatus and the caching method includes:

a cache checking unit referring the delivery request for the media file to the media server issued by the client, managing a location of the media file, and checking if the requested media file is stored in the cache server as the cache file;

a streaming data caching unit referring to streaming data delivered from the media server to the client and storing the streaming data as the cache data;

a streaming data delivering unit delivering the stored cache data, and the cache server apparatus and the caching method temporarily stores the streaming data as the cache data if the cache file is not stored, when the client issues the delivery request for the media file to the media server, performs the streaming delivery using the cache data before the media file has not been obtained, and performs the streaming delivery using the cache file after the media file has been obtained.

According to the eighth embodiment, the cache server apparatus and the caching method further includes a cache data deleting unit deleting the cache data after the media file has been obtained.

Having thus described several particular embodiments of the present invention, various alterations, modifications, and improvements will readily occur to those skilled in the art. Such alterations, modifications, and improvements are intended to be part of this disclosure, and are intended to be within the spirit and scope of the present invention. Accordingly, the foregoing description is by way of example only, and is not intended to be limiting. The present invention is limited only as defined in the following claims and the equivalents thereto.

What is claimed is:

1. A data communication apparatus for communicating between a terminal device requesting streaming delivery of information data and a delivering apparatus holding at least one information data file containing at least one piece of the requested information data and for performing the streaming delivery of the information data requested by the terminal device, the data communication apparatus comprising:
a file caching unit configured to store information data files;
a delivery request receiving unit for receiving a delivery request for streaming delivery of specific information data from the terminal device;
a data checking unit for determining if the specific information data requested by the delivery request is stored in the file caching unit, and for sending the delivery request received from the terminal device to the delivering apparatus if an information data file containing the specific information data requested is not stored in the file caching unit;
a file transmission requesting unit for sending a file transmission request requesting transmission of an information data file containing the specific information data requested by the terminal device to the delivering apparatus if it is determined that an information data file containing the specific information data request is not stored in the file caching unit; and
a file receiving unit for receiving the requested information data file from the delivering apparatus in response to the file transmission request,
wherein the file caching unit stores the requested information data file received from the delivering apparatus.

2. The data communication apparatus of claim 1 further comprising:
a data delivering unit performing the streaming delivery of the specific information data requested to the terminal device from the file caching unit if it is determined that an information data file containing the specific information data requested is stored in the file caching unit.

3. The data communication apparatus of claim 2, wherein, when the delivery request receiving unit receives the delivery request for the specific information data from a new terminal device before the file caching unit finishes storing the requested information data file, the data delivering unit performs the streaming delivery of the requested information data to the new terminal device from the file caching unit after the requested information data file has been stored in the file caching unit.

4. The data communication apparatus of claim 2 further comprising:
an information data receiving unit for receiving the specific information data from the delivering apparatus; and
an information data caching unit for storing the specific information data received by the information data receiving unit, and
wherein, when the delivery request receiving unit receives the delivery request for the specific information data from a new terminal device before the information data caching unit finishes storing the specific information data, the data delivering unit performs the streaming delivery of the received requested information data to the new terminal device sequentially from a part of the received requested information data, which has been already stored in the information data caching unit.

5. The data communication apparatus of claim 4 further comprising:
a data deleting unit for deleting duplicated information data stored in the information data caching unit when the information data in the file caching unit and the information data in the information data caching unit are duplicated.

6. The data communication apparatus of claim 1 further comprising:
a communication rate checking unit for checking a communication rate available for receiving the requested information data file; and
a communication rate setting unit for setting the communication rate used for receiving the requested information data file based on the available communication rate checked by the communication rate checking unit,
wherein the file receiving unit receives the requested information data file at the communication rate set by the communication rate setting unit.

7. The data communication apparatus of claim 1, further comprising:
a communication channel selecting unit for selecting a communication channel for receiving the requested information data file from the delivering apparatus, and
wherein the file receiving unit receives the requested information data file using the communication channel selected by the communication channel selecting unit.

8. The data communication apparatus of claim 1 further comprising:
a delivery request counting unit for counting a number of times for each specific information data requested the data checking unit sends the delivery request to the delivering apparatus, and
wherein the file transmission requesting unit sends the file transmission request to the delivering apparatus only for the requested information data of which the number of transmission counted by the delivery request counting unit exceeds a predetermined threshold value.

9. The data communication apparatus of claim 1 further comprising:
a communication rate dynamically setting unit for dynamically setting a communication rate used for receiving the requested information data file from the delivery apparatus, and
wherein the file receiving unit receives the requested information data file at the communication rate dynamically set by the communication rate dynamically setting unit.

10. A data communication method for communicating between a terminal device requesting streaming delivery of information data and a delivering apparatus holding at least one information data file containing the requested information data and performing the streaming delivery of the information data requested by the terminal device, the method comprising:
receiving a delivery request for streaming delivery of specific information data from the terminal device;
determining if an information data file containing the requested information data has been previously stored;
sending the delivery request to the delivering apparatus if it is determined that an information data file containing the requested information data has not been stored;
sending a file transmission request requesting transmission of an information data file containing the requested information data to the delivering apparatus if it is determined that an information data file containing the requested information data has not been stored;
receiving the requested information data file from the delivering apparatus in response to the file transmission request;
storing the requested information data file received from the delivering apparatus; and streaming the requested information data to the terminal device if it is determined that an information data file containing the requested information has been stored.

11. The data communication method of claim 10, further comprising:

determining an available communication rate available for receiving the requested information data file; and setting the communication rate used to receive the requested information data file based on the available communication rate; and wherein the requested information data file is received at the set communication rate.

12. The data communication method of claim 10, further comprising:

selecting a communication channel for receiving the requested information data file from the delivering apparatus, and wherein the requested information data file is received using the selected communication channel.

13. The data communication method of claim 10, further comprising:

counting a number of times for each specific information data requested the delivery request is sent to the delivering apparatus, and wherein the file transmission request is sent to the delivering apparatus only if the counted number exceeds a predetermined threshold value.

14. The data communication method of claim 10 further comprising:

dynamically setting a communication rate for receiving the requested information data file from the delivering apparatus, and wherein the requested information data file is received at the set communication rate.

15. The data communication method of claim 10, further comprising:

receiving a second delivery request for the requested information data from a new terminal device before the requested information data file is completely stored;

streaming delivery of the requested information data to the new terminal device before the requested information data file has been stored in the file caching unit.

* * * * *